Sept. 24, 1968 A. A. OSWALD ET AL 3,403,187
POLYTHIOETHERDITHIOLS AND PROCESS FOR PRODUCING SAME
Filed Nov. 30, 1964
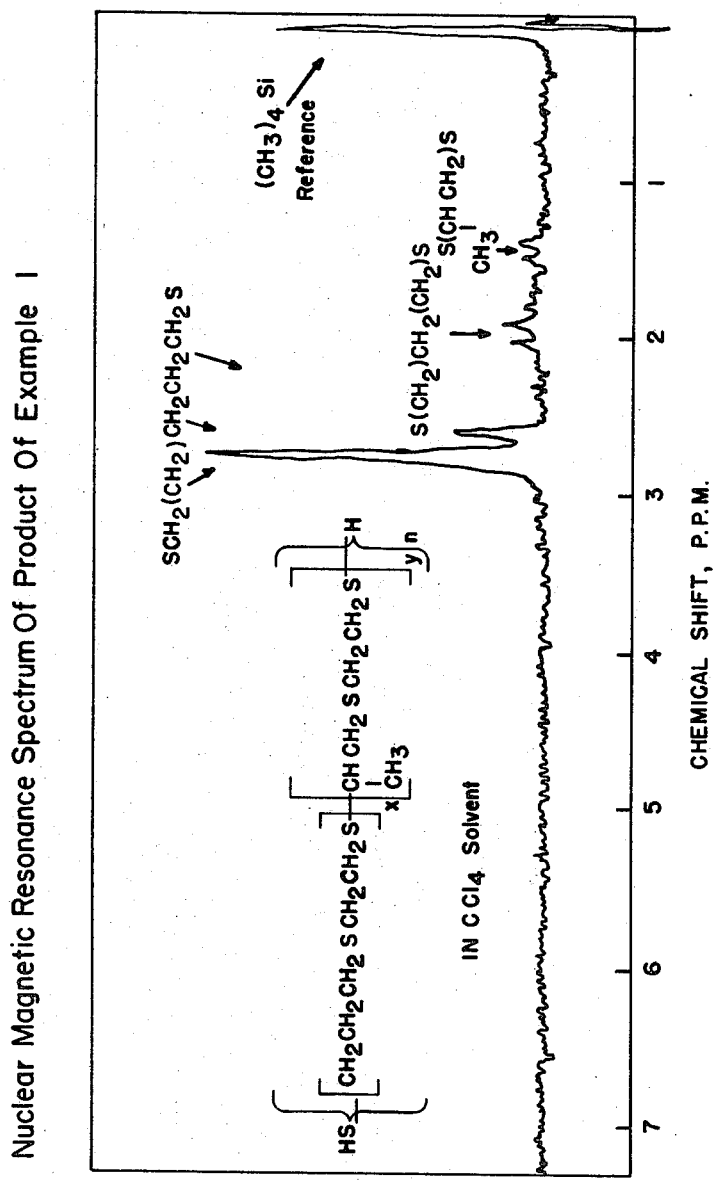
Alexis A. Oswald
Karl Griesbaum          Inventors
Daniel N. Hall
By C. D. Tores
Patent Attorney

United States Patent Office 3,403,187
Patented Sept. 24, 1968

3,403,187
POLYTHIOETHERDITHIOLS AND PROCESS
FOR PRODUCING SAME
Alexis A. Oswald, Mountainside, Karl Griesbaum, Elizabeth, and Daniel N. Hall, Linden, N.J., assignors to Esso Research and Engineering Company, a corporation of Delaware
Filed Nov. 30, 1964, Ser. No. 414,582
16 Claims. (Cl. 260—609)

ABSTRACT OF THE DISCLOSURE

Allene is reacted with aliphatic, and aromatic dithiols in a selective free radical process primarily via diterminal attack to form novel thiol and/or allyl terminated difunctional polythioetherdithiols useful as elastomer, mastics and adhesives intermediates and as constituents for room temperature curable rubbers, sealants, etc. Inherent to their unique synthesis these polymer intermediates contain the structural units derived from the dithiol and the allene in an alternating fashion and exhibit some dispersed branching resulting from center attack side reactions.

---

This invention relates to the prepartion of polythioetherdithiols and more specifically relates to the preparation of such dithiols by the addition of dithiols to allene.

It has been known (Organic Reactions, Edited by C. Cope, Vol. 13, Chapter 4: "Formation of Carbon-Hetero Atom Bonds by Free Radical Chain Additions to Carbon-Carbon Multiple Bonds" by F. W. Stacey and J. F. Harris, Jr., page 184, J. Wiley & Sons, Inc., New York, New York, 1963) that radical additions of dithiols to di-olefins may lead to polymeric materials. Unconjugated diolefins were found satisfactory starting materials. However, conjugated diolefins which are more readily available petrochemical starting materials were unsatisfactory since the initial allylic adducts do not undergo further addition readily [C. S. Marvel and H. N. Cripps, J. Pol. Sci. 8, 313 (1952)].

In accordance with the present invention it has been found surprisingly that a cumulative diene, allene, which is also a simple petrochemical from hydrocarbon cracking, very readily undergoes such polyadditions. The result of such polyadditions may be schematically represented as follows:

$CH_2=C=CH_2+HSRSH \longrightarrow$

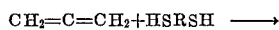
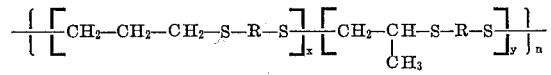

where
$x > y$
$x+y=n$
$y \sim 1$
$x = 1-25$

This reaction gives a polymeric backbone which is the result of stepwise additions. The use of a large excess of allene result in the formation of diallylic adducts:

$2CH_2=C=CH_2 + HSRSH \rightarrow$
$CH_2=CHCH_2SRSCH_2CH=CH_2$

As a by-product, polymeric residues with allylic end groups are obtained:

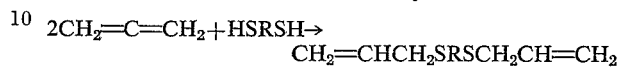

Thus the product of this invention can be represented by the following general formula:

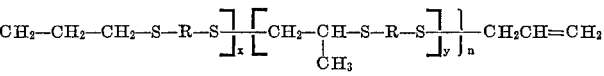

where T and U are each hydrogen or allyl, R is a divalent hydrocarbylene radical such as alkylene, arylene, or aralkylene, and x and y are the same as above.

The formation of trimethylene-bis-sulfide polymer units subscribed by $x$ is apparent by the result of further thiol additions to the allylic primary adducts of allene. The intermediates for the propylene-bis-sulfide polymer units subscribed by $y$ are probably the propenyl derivatives of the following postulated reaction:

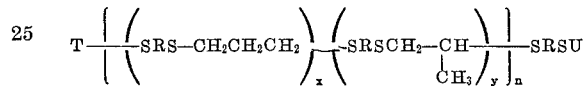

These intermediates, if formed, apparently react very fast with further amounts of the dithiol compound to yield the propylene units.

A moderate excess of dithiol results in a thiol terminated polymer:

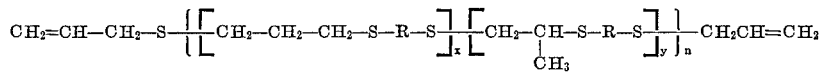

This is due to the fact that both the propenyl and allyl compounds react with thiols at faster rates than allene itself.

Increasing the excess of the dithiol results in decreasing the molecular weight. In case of large excess the product is the following diadduct:

$HS-R-S-CH_2-CH_2-CH_2-S-R-SH$ with some of the isomeric compound:

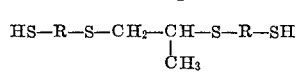

The allylic oligomers, of course, may be reacted with more of the same or different dithiol. In turn, the polythioether dithiol may be reacted with more allene.

All these various additions to the olefinic double bonds take place by a free radical mechanism. This requires the initial formation of a thiyl radical.

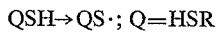
$QSH \rightarrow QS\cdot; Q=HSR$

This radical, in turn, reacts with the olefin to form an intermediate radical which on reacting with the thiol regenerates the thiyl radical in a chain fashion:

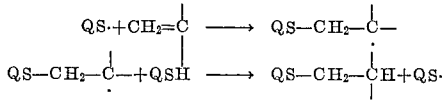

Suitable dithiols include polymethylene dimercaptans such as di- or trimethylene dimercaptan, 1,2-propanedithiol, or their amino, chloro, bromo, cyano or aromatic substitution products such as xylene dithiol; various isomeric benzene- and naphthalenedithiols or their alkyl substituted products; toluenedithiols, xylenedithiols, etc.

The preferred dithiol reactants are the $C_1$ to $C_4$ polymethylene dimercaptans such as ethane dithiol, trimethylene dithiol, and 1,2-propane-dithiol. Aromatic dimercaptans such as xylylene dithiol are also useful.

The above-described reaction is normally carried out in the presence of a catalyst. The catalysts employable in the novel reaction of this invention are free-radical type initiators and include ultraviolet light, gamma radiation and a wide variety of peroxidic and azo compounds. Typical free-radical initiators are cumene hydroperoxide, tertiary butyl hydroperoxide, bis-tertiary butyl peroxide, and bis-azo-isobutyronitrile. When free-radical initiator compounds are employed, they will normally constitute 0.01 to 10 weight percent, preferably 0.1 to 5 weight percent, based on allene, of the reaction mixture. In a preferred embodiment, the free-radical catalyst is a combination of a peroxidic or azo compound and ultraviolet initiation. It has been found that ultraviolet irradiation accelerates the free-radical initiator compound decomposition, thereby resulting in an effective chain initiation and, consequently, high yields of the desired products in a short reaction period.

A wide variety of reaction conditions may be employed in the process of the present invention. Suitable reaction temperatures are in the range of $-100$ to $+120°$ C., preferably $-70$ to $+100°$ C., for example 15° C. The reaction pressure is not critical and superatmospheric, as well as atmospheric, pressures may be employed in the reaction period. Typical reaction pressures are in the range of 0 to 750 p.s.i.g. and preferably 10 to 150 p.s.i.g., for example, 50 p.s.i.g. In a preferred embodiment, the reaction is carried out at room temperature in a sealed reaction chamber. Such a procedure has the effect of creating a pressure in the range of 40 to 120 p.s.i.g. due to the vapor pressure of the allene gas.

The ratio of allene to dithiol will vary depending upon the number of thiol groups desired in the final product and may vary between 0.05 and 3 moles of dithiol per mole of allene.

The polyaddition process goes through neutral, stable intermediates which have decreasing reactivity with increasing molecular weight. Above 3000 molecular weight this usually becomes a limiting factor. In any case the polymer is thiol and/or allyl terminated and thus is chemically reactive. The products of the invention are thus suitable as intermediates in the preparation of various higher molecular weight products.

Reactions of the polymer of this invention with trifunctional or polyfunctional molecules lead to three-dimensional polymer networks. For example, the polymer of this invention may be reacted with polybutadiene or the copolymer of butadiene and styrene such as the polymers described in U.S. Patent Nos. 2,712,562, 2,791,618, 2,849,510 and 2,826,618, and the like. Thus, the polythioether dithiols of this invention are especially promising intermediates for the preparation of elastomers such as rubbers, foams, and the like and are particularly suited as constituents for room temperature curable rubbers, sealants, etc.

The invention will be further understood by reference to the following illustrative examples.

Example 1.—Addition of ethanedithiol to allene

A stirred mixture of 23.5 grams (0.25 mole) of 1,2-ethanedithiol, 12 grams (0.3 mole) of allene and 0.09 gram (0.001 mole) of t-butyl hydroperoxide catalyst in a sealed quartz tube was irradiated by a 100 watt Hanau medium pressure ultraviolet immersion lamp for ninety minutes at 15° C. By the end of this period half of the contents of the tube were converted to the solid dithiol polymer and consequently it became impossible to continue the stirring of the reaction mixture. Therefore, the mixture was melted by heating it to 42° C. and the addition was completed at the temperature in fifteen more hours.

The product was a semisolid polythioether which could be purified by dissolution in benzene and reprecipitation by an excess of methanol to yield a solid product. A nuclear magnetic resonance (N.M.R.) spectrum of the polymer (shown in FIGURE 1) indicated that it contained dimethylene, trimethylene, and propylene units bonded through sulfur. N.M.R. indicated and a potentiometric titration by silver nitrate proved that the polymer had thiol end groups. Assuming a dithiol polymer, the molecular weight was 1500 on the basis of the potentiometric titration.

*Analysis.*—Calcd. for

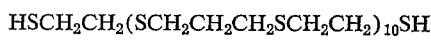

$C_{52}H_{126}S_{22}$ (Molecular weight, 1457): C, 42.87; H, 8.71; S, 48.42. Found: C, 44.28; H, 7.88; S, 47.44. Osmometric molecular weight, 1404.

Example 2.—Addition of trimethylenedithiol to allene at ambient temperatures

Allene was bubbled into 54 grams (0.5 mole) of trimethylene dithiol in a quartz tube at 15° with ultraviolet light irradiation for eleven hours. During this period 16 grams (0.4 mole) of allene was absorbed and the reaction mixture solidified to yield the raw polytrimethylenesulfide dithiol. By a repeated benzene dissolution-methanol reprecipitation procedure 50 grams (84.5%) of a purified polymer having an average molecular weight of 850 was obtained. N.M.R. again indicated and potentiometric titration by silver nitrate proved that the polymer had thiol end groups. Assuming a dithiol polymer, the potentiometric titration indicated a molecular weight of 837.

*Analysis.*—Calcd. for $C_{27}H_{56}S_{10}$ (for

with a molecular weight of 701.5): C, 46.24; H, 8.04; S, 45.72. Found: C, 45.33; H, 7.06; S, 45.05.

Example 3.—Addition of trimethylenedithiol to allene at $-75°$ C.

A mixture of 19.5 grams (0.5 mole) of allene and 19.9 grams (0.18 mole) of 1,3-propanedithiol was irradiated by ultraviolet light for six hours while being kept in an isopropanol-Dry Ice bath at about $-75°$ C. The resulting mixture was then fractionated by distillation in vacuo. As a forerun 4 grams (21%) of propanedithiol was recovered. Then 13 grams of 3-allylmercaptopropanethiol and other liquid oligomeric adducts were obtained between 27–92° C. at 0.5 mm. The residue (12 grams) was a very viscous oily polymeric polythioether.

*Analysis.*—Found: C, 44.85; H, 7.37; S, 47.95.

Example 4.—Addition of trimethylenedithiol to an excess of allene

A magnetically stirred mixture of 16.2 grams (0.15 mole) of trimethylenedithiol and 72 grams (1.8 mole) of allene was U.V. irradiated at 16° C. for twenty-four hours in a closed quartz pressure tube. The reaction mixture then was reacted to recover most of the unreacted allene. The residue was analyzed by N.M.R. spectroscopy. According to the spectrum it contained trimethylene [S(CH₂)₃S] vs. propylene [SCH₂CH(CH₃)S] units in a 5 to 1 ratio.

Fractional distillation of the residue in vacuo yielded 13 grams (46%) of diallyl trimethylene-bis-sulfide, boiling between 82–88° at 0.3 mm. pressure.

The residue 11.5 grams is a liquid polymer with a number average osmotic molecular weight of 449. Its N.M.R. spectrum indicates that it has allylic end groups. The trimethylene vs. propylene ratio is 5 to 1. Calcd. for $$CH_2=CHCH_2S(CH_2CH_2CH_2S)_5CH_2CH=CH_2$$

(mol. wt. 485): C, 52.02; H, 8.31; S, 39.67. Found: C, 54.14; H, 8.23; S, 38.30.

Example 5.—Addition of an excess of trimethylene dithiol to allene

A mixture of 76.4 grams (0.7 mole) of trimethylene dithiol and 14 grams (0.35 mole) of allene were reacted

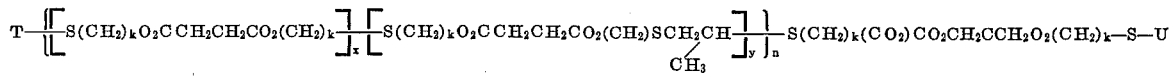

at 16° C. for six hours under the effect of ultraviolet irradiation in the manner described in the earlier examples. The resulting product was heated to 215° C. at 0.05 mm. pressure to remove the unreacted trimethylenedithiol as a distillate. The nuclear magnetic resonance spectrum of the resulting liquid residual product indicated that is was essentially the diadduct $$HSCH_2CH_2CH_2SCH_2CH_2CH_2SCH_2CH_2CH_2SH$$

Examples 6–9.—Polyaddition of different dithiols to allene

In the following experiments different dithiols (0.1 m.) were placed in a quartz pressure tube equipped with a magnetic stirrer and a Teflon-clad screw seal. The tube contents were frozen at −70° and the tube was evacuated at an oil pump. Then 5.8 ml. (at −70°, 1 atoms.) of allene (0.1 m.) was distilled into the tube which was then sealed. The reaction mixture was irradiated at 17–20° with a U.V. lamp from a distance of 5 cm. The tube was then opened and the unreacted allene allowed to evaporate. The crude products were stirpped at 100–150°/1–5 mm. by drawing nitrogen through them and then dissolved in an approximately equal volume of benzene and precipitated as oily liquids by dropping into 5 volumes of methanol. After drying to constant weight in vacuo, the viscous liquid products were analyzed. A summary of the experiments and their results are shown in Table I.

The advantages of the present invention having been thus fully set forth and specific examples of the same given, what is claimed as new and useful and desired to be secured by Letters Patent is:

1. A polymeric composition of matter

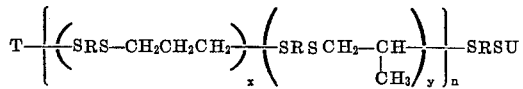

where T and U are each chosen from the group consisting of hydrogen and allyl, R is a divalent hydrocarbylene radical chosen from the group consisting of xylylyl, naphthyl, tolyl, and xylyl, and x and y are numbers from 0 to 100 and n is a number between 2 and 26.

2. As a composition of matter a polymeric compound of the structure

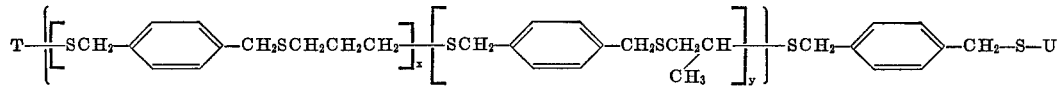

where x, y and n are numbers from 1 to 25 and T and U are chosen from the group consisting of hydrogen and allyl.

3. As a composition of matter a polymeric compound of the structure

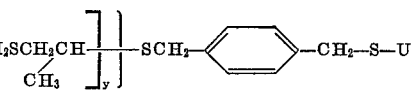

where k equals 1 to 2, x, y and n are numbers from 1 to 25 and T and U are each chosen from the group hydrogen and allyl.

4. As a composition of matter a polymeric compound of the structure

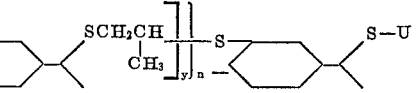

where x, y and n are numbers from 1 to 25 and T and U are chosen from the group hydrogen and allyl.

5. As a composition of matter a compound of the structure

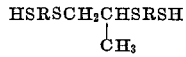

where R is a divalent C₁ to C₄ alkylene radical.

6. As a composition of matter a compound of the structure $$CH_2=CHCH_2SCH_2CH_2CH_2SCH_2CH=CH_2$$

7. As a composition of matter, a compound of the structure $$HSCH_2CH_2CH_2SCH_2CH_2CH_2SCH_2CH_2CH_2SH$$

8. As a composition of matter, a compound of the structure $$HSCH_2CH_2(SCH_2CH_2CH_2SCH_2CH_2)_{10}SH$$

9. As a composition of matter, a compound of the structure $$H(SCH_2CH_2CH_2)_9SH$$

TABLE I.—ADDITION OF VARIOUS DITHIOLS TO ALLENE

| Exp. No. | Dithiol Reagent | Initiator (1 mole percent) | Irradiation, hours | Crude yield, percent | Osmometric mol. wt. | Elemental Analyses, percent | | |
|---|---|---|---|---|---|---|---|---|
| | | | | | | C | H | S |
| 6 | HSCH₂–⟨⟩–CH₂SH | (CH₃)₃COOH | 9 | 87 | 547 | 60.39 | 6.57 | 32.72 |
| 7 | (HSCH₂CO₂CH₂)₂ | (CH₃)₃COOH | 48 | 88 | 1,245 | 38.13 | 5.42 | 28.08 |
| 8 | HS–CH₂CH(CH₃)SH | None | 48 | 93 | 1,126 | 46.80 | 8.40 | 44.65 |
| 9 | SH–⟨⟩–SH | None | 50 | 85 | 757 | 61.66 | 9.83 | 21.36 |

10. A process for the preparation of polythioether-dithiols which comprises reacting allene with 0.05 to 3 moles of a dithiol per mole of allene, said dithiol being chosen from the group consisting of polymethylene dithiols and their chloro, bromo and cyano substitution products; benzenedithiols, naphthalenedithiols, and xylenedithiols, at a temperature in the range of −100 to +120° C. and a pressure in the range of 0 to 750 p.s.i.g. in the presence of a free radical catalyst.

11. The process of claim 10 in which the dithiol is trimethylene dithiol and the catalyst is ultraviolet light.

12. The process of claim 10 in which the dithiol is 1,2-propanedithiol and the catalyst is ultraviolet light.

13. The process of claim 10 in which the dithiol is xylylenedithiol and the catalyst is a ultraviolet light.

14. The process of claim 10 in which the dithiol is bis-carboxyethylene-methanethiol and the catalyst is ultraviolet light.

15. The process of claim 10 in which the catalyst is a combination of tertiary butyl hydroperoxide and ultraviolet light.

16. The process of claim 15 in which the dithiol is ethane dithiol and the catalyst is ultraviolet light.

References Cited

UNITED STATES PATENTS

| | | | |
|---|---|---|---|
| 2,454,099 | 11/1948 | Signaigo | 260—609 |
| 2,563,383 | 8/1951 | Vaughan et al. | 260—609 |
| 3,070,580 | 12/1962 | Harmon | 260—79 |

OTHER REFERENCES

Griesbaum et al.: "J. Org. Chem.," vol. 28, pp. 1952–1957 (1963).

Van der Ploeg et al.: "Rec. Trav. Chem.," vol. 81, pp. 775–785 (1962).

Jacobs et al.: "J. Org. Chem.," vol. 28, pp. 2692–2697 (1963).

CHARLES B. PARKER, *Primary Examiner.*

D. R. PHILLIPS, *Assistant Examiner.*